United States Patent
Cummings, Jr. et al.

(10) Patent No.: US 7,069,121 B1
(45) Date of Patent: Jun. 27, 2006

(54) COMPUTERIZED METHOD FOR INTEGRATION AND FACILITATING SINGLE SOURCE ACCESS TO USER COMMUNITY MESSAGING TRANSPORT VEHICLE LOCATION STATUS, VEHICLE MAINTENANCE REQUIREMENT AND SERVICE PROCEDURES

(75) Inventors: Joe Lynn Cummings, Jr., Tulsa, OK (US); Kyle E. Wander, Tulsa, OK (US); James N. Vedda, Tulsa, OK (US)

(73) Assignee: American Airlines, Inc., Dallas/Ft. Worth Airport, TX (US)

( * ) Notice: Subject to any disclaimer, the term of this patent is extended or adjusted under 35 U.S.C. 154(b) by 0 days.

(21) Appl. No.: 11/198,616

(22) Filed: Aug. 5, 2005

(51) Int. Cl.
*G01C 23/00* (2006.01)

(52) U.S. Cl. .............................. 701/3; 701/29; 701/33; 340/825.49

(58) Field of Classification Search .................... 701/1, 701/3, 29, 30, 31, 33, 35, 213, 208, 207, 701/209, 210; 340/825.49; 342/357.1–357.13; 307/9.1
See application file for complete search history.

(56) References Cited

U.S. PATENT DOCUMENTS

| 5,948,040 A * | 9/1999 | DeLorme et al. ............ 701/201 |
| 5,952,941 A * | 9/1999 | Mardirossian .............. 340/936 |
| 6,453,237 B1 * | 9/2002 | Fuchs et al. ................. 701/213 |
| 6,526,335 B1 * | 2/2003 | Treyz et al. ................... 701/1 |
| 6,711,474 B1 * | 3/2004 | Treyz et al. ................... 701/1 |
| 6,728,612 B1 * | 4/2004 | Carver et al. ................. 701/33 |

* cited by examiner

*Primary Examiner*—Richard M. Camby
(74) *Attorney, Agent, or Firm*—Edwards E. Richards, II; Winstead Sechrest & Minick P.C.

(57) ABSTRACT

A computerized method for integrating and facilitating single source access to user community messaging transport vehicle location and vehicle maintenance and requirements and servicing procedures comprised of a plurality of databases and proprietary software systems which are accessed through a web portal application eliminating the need for arduous and extensive knowledge of input entry format with respect to database/proprietary system utilization.

14 Claims, 3 Drawing Sheets

COMPUTERIZED METHOD FOR INTEGRATION AND FACILITATING SINGLE SOURCE ACCESS TO USER COMMUNITY MESSAGING TRANSPORT VEHICLE LOCATION STATUS, VEHICLE MAINTENANCE REQUIREMENT AND SERVICE PROCEDURES

CROSS REFERENCE

This application does not claim priority from any prior application.

STATEMENT OF FEDERALLY SPONSORED RESEARCH/DEVELOPMENT

This application is not federally sponsored research/development.

REFERENCES TO SEQUENCE LISTING

This application is not referenced to any microfiche appendix.

BACKGROUND AND SUMMARY OF THE INVENTION

Computerized fleet maintenance systems are known in the industry. Proprietary data bases and software systems emphasizing transport vehicle maintenance requirements are also known in the industry. What is not known in the industry is a computerized methodology which integrates proprietary transport vehicle maintenance data bases, vehicle servicing requirements, host systems central processing units executing transport vehicle maintenance software and a web portal capability which facilitates single source access to user community messaging, transport vehicle location status, vehicle maintenance requirements and servicing procedures.

The robust and versatile processing capability of the present invention in one embodiment eliminates the need for technicians to access several separate applications to perform their regular job functions. In the case of the airline industry for example American Airlines, systems typically requiring access to satisfy transport vehicle information requests include the Flight Operating System (a.k.a. "FOS") the Dispatch Environmental Control System (a.k.a. "DECS") which represent one or more host based systems that provides flight operation and aircraft maintenance requirements.

The present invention is the only application that provides for a computerized method for integrating and facilitating single source access to user community messaging transport vehicle location and vehicle maintenance and requirements and servicing procedures comprised of a plurality of databases and proprietary software systems which are accessed through a web portal application eliminating the need for arduous and extensive knowledge of input entry format with respect to database/proprietary system utilization. It is to be noted that the present invention will be discussed for purposes of clear and full non-disclosure in terms of application to the airline industry, though those skilled in the art will easily recognize the benefits, objects and claims of the instant invention to be equally applicable to other industrial applications such as over the road freight transport and ocean shipping. Further, the term transport vehicle as discussed throughout the present invention disclosure shall be deemed to be used in a non-exclusive manner synonymously and interchangeably with the term "aircraft" or "airplane" as such terms are commonly used and recognized throughout the industry.

The present invention in one embodiment is a combining of software processing integration into a single resource. In the same embodiment the invention is programmed in active server pages on the web server and utilizes standard CSAPI connection to a host-based system. As such the invention may be most readily conceptualized as a web-based application that serves as a single source of maintenance information for mechanics such as, but not limited to, airline maintenance and engineering line maintenance mechanics. The invention further provides links to various electronic resources within the airlines as well as messaging between users and access to airline legacy mainframe environments.

Consequently, given the deficiencies presented by the multiplicity of systems in the contemporary environment and in view of the benefits, disclosures and claims of the present invention, it is an object of the instant invention to teach a single point of reference web-based portal that provides an integrated environment to access and address required transport vehicle line maintenance requirements.

It is another object of the present invention to allow technicians to have access to commonly used manuals, transport vehicle information such as flight information, maintenance requirements, host (legacy systems referencing base data and web-based applications).

It is the further object of the present invention to eliminate the need for line maintenance technicians such as mechanics to access several separate systems to perform their duties.

Another object of the invention to provide a graphical user to serve as a single point of reference facilitating user input which is subsequently translated into arcane and particularized system dependent input entry formats for execution on one or more proprietary host-based systems.

It is yet another object of the instant invention to provide a single point of reference for line maintenance personnel such as mechanics to access for their computing tasks.

Therefore there is a need for a computerized method of integrating and facilitating single source access to user community messaging, transport vehicle location status, host-based vehicle maintenance requirements and service procedures.

DETAILED DESCRIPTION OF THE INVENTION

Figure 1:
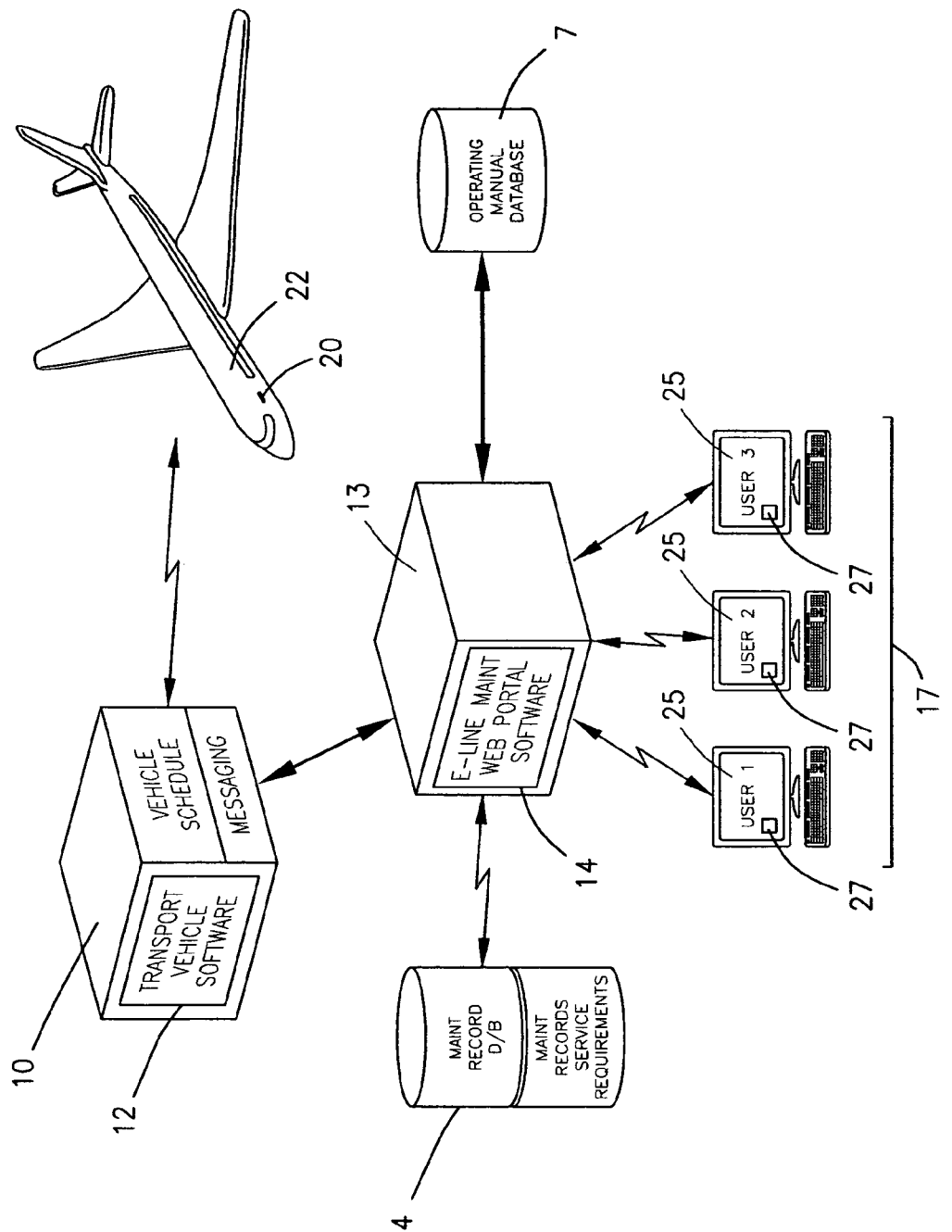
FIG. 1 is an illustration of primary hardware and software components associated with the practice of one embodiment of the present invention.

The present invention will now be described with reference to the drawings wherein like reference numerals are used to refer to like elements throughout.

FIG. 1 is an illustration of primary hardware and software components associated with the practice of one embodiment of the present invention. In FIG. 1 a user community 17 comprised of one or more transportable central processing units 25 is shown executing user community software 27 in communication with the invention's web portal central processing unit 13 and web portal software 14 executing therein. The web portal software 14 and web portal central processing unit 13 are shown in communication with a transport vehicle maintenance record data base 4 containing maintenance records, service requirements and, operating manual database 7. Though illustrated as independent and separate databases here, it is clear to those skilled in the art that communication with the aforenoted databases 4, 7 may be facilitated via communication with a plurality of databases as shown or one composite database (not shown). As used herein the term database will be recognized by those skilled in the art to be used inter-changeably and synonymously with a collective group of records relating to and accessible to one or more application systems. The database construct may be hierarchical, relational or other definable structure accessible to known and future database management systems (DBMS).

Further shown in FIG. 1 are one or more first host central processing units 10 executing transport vehicle maintenance software 12. The one or more host central processing units and software executing therein are typically referred to within the airline industry as proprietary host (legacy systems). In one application of the instant invention such transport vehicle software would be the American Airlines Sabre System® and one or more of its processing subcomponents such as the Dispatch Environmental Control System (DECS) and Flight Operating System (FOS). As will be discussed in further detail, the transport vehicle software 12 and host processing system 10 are shown in communication with a transport vehicle 22 and one or more transportable central processing units 20 in an accommodating position within the transport vehicle 22, the one or more transportable central processing unit's 20 executing software with the one or more host central processing units 10 and software 12.

Figure 2:
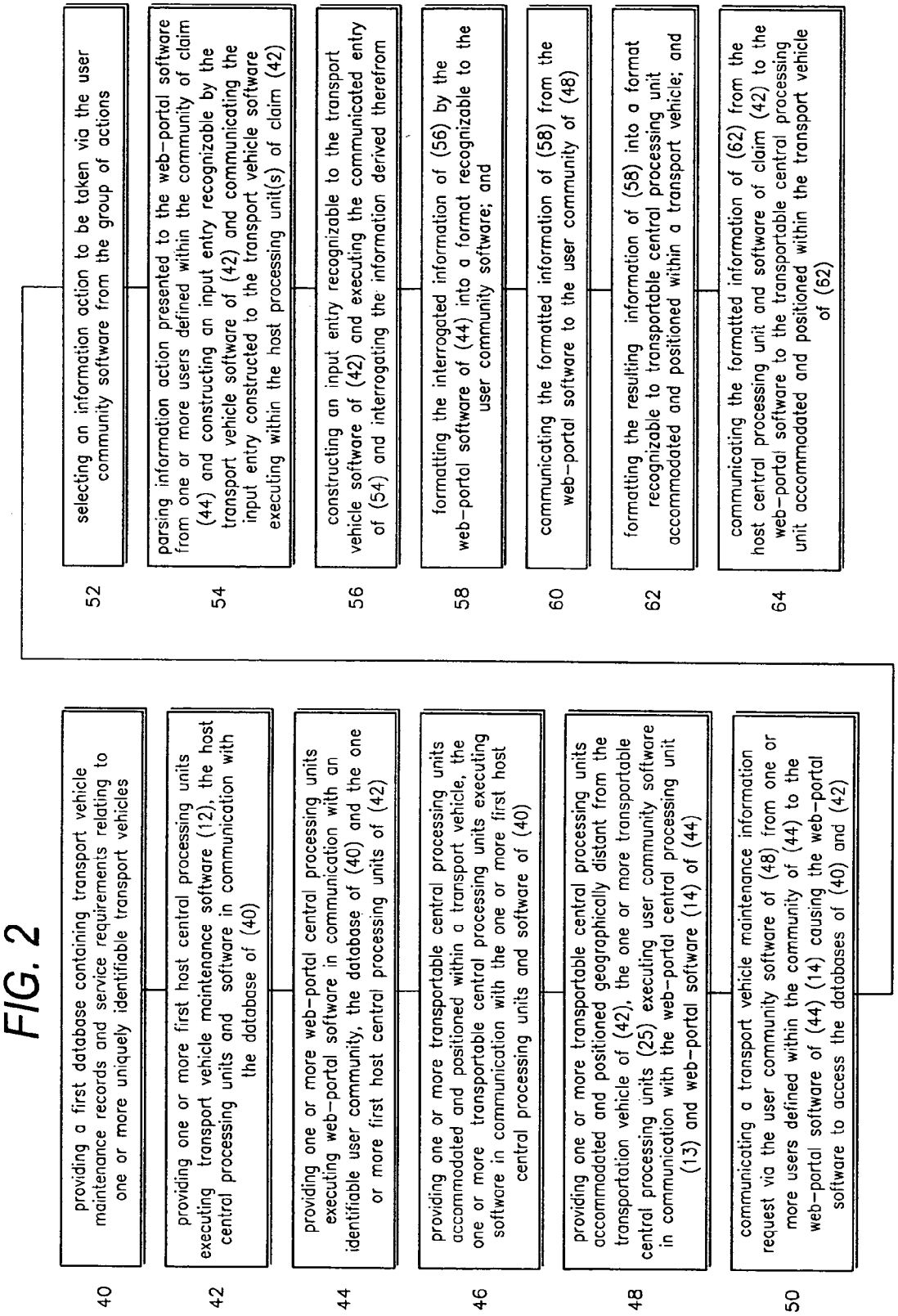
FIG. 2 is a non-limiting sequence of methodology steps executed in association with practice of the instant invention.

FIG. 2 illustrates a non-limiting sequence of methodology steps executed in association with practice of the instant invention. Turning now to FIG. 2. In FIG. 2 it is seen where the invention practice calls for the providing of a first database containing transport vehicle maintenance records and service requirements relating to one or more uniquely identifiable transport vehicles 40. The invention next provides for one or more first central processing units executing transport vehicle maintenance software, the host central processing unit software in communication with the database containing transport vehicle maintenance records and service requirements relating to one or more uniquely identifiable transport vehicles 42. The invention continues to provide one or more web portal central processing units executing web portal software in communication with an identifiable user community 44. The first data base containing transport vehicle maintenance records and service requirements and the one or more first host central processing units executing transport vehicle maintenance software. The invention continues to provide a plurality of transportable central processing units with one or more of the central processing units accommodated and positioned within a transport vehicle and executing software in communication with the host processing central processing unit and host processing unit software 46. This grouping of transportable central processing units relates to those transportable central processing units positioned within transport vehicles such as but not limited to commercial aircraft. A second group of transportable central processing units are accommodated in position geographically distant from the transportable central processing units with each one of this group of transportable central processing units executing user community software and communication with the web portal central processing unit and web portal software.

In practice a transport vehicle maintenance information request is communicated from the transportable central processing units accommodated in position geographically distant from a transport vehicle by user community software 48 from one or more users defined within the community 44 to the web portal software 48. This communication is facilitated typically by a graphic user interface. A graphic user interface is a means of communication readily appreciated and known to those skilled in the art. The communicated information request causes the web portal software to interpret the request 52 and generate a format dependent input entry to access either the transport vehicle maintenance records and service requirements directly or the transport vehicle maintenance software executing within the one or more first host central processing units 54. In practice, a user may request to see, for example, the past fifteen days of maintenance activity for an aircraft using the graphic user interface. The web portal software then communicates with the host central processing units by sending a textual command to the system, and receiving plain text back from the system. The host central processing unit, in turn, executes the command 56 and interrogates an applicable data base in response to the user information request. The interrogated information responsive to the information request is then formatted and communicated to the one or more users within the community requesting information 60 via GUI.

The communication of a transport vehicle maintenance request from one or more users to the web portal software comprises selecting an information action to be taken via the user community software from a group of actions including.

a Request Maintenance History for an Aircraft (KVA/DAYS/AIRCRAFT/SYSTEM/STATUS/PRIORITY)
b. Request Open Maintenance Items for An Aircraft (RGMN AIRCRAFT)
c. Request Flight Plan for the Aircraft for the next 3 Days (RGA Aircraft F3)
d. Request Detailed Flight Information (FIL FLIGHT #)
e. View Overnight Workload Schedule for an Aircraft (EW*STATION AIRCRAFT)
f. Accomplish Overnight Workload Item (EJTA Aircraft Station Date Job Name)
g. Defer Overnight Workload Item (EWX Aircraft JobName Station Date)
h. Add Part Number Reference to Maintenance Record Item (KP Part Number)
i. Add Deferral Reason to Maintenance Record Item (KD Deferral Reason)
j. Add Information Line to Maintenance Record Item (KI Text)
k. Add Position Code to Maintenance Record Item (KPC PositionCode)
l. Display an individual Maintenance Record Item (K* Record Number)
m. Save an individual Maintenance Record Item (KET)
n. Ignore Changes to a Maintenance Record Item (KIG)
o. View Aircraft Configuration (JDM* Aircraft Number)
p. View Engineering Change Orders for an Aircraft (M3P* Aircraft Number)
q. View Inbound Flights to an Airport (RGS Airport)
r. View Detailed Gate Activity for a single gate in an airport (RGT Airport Gate)
S. View Flight Status Information (FL Flight Number)

t. View Cancellations at a single Airport (XI*Airport)
u. View Maintenance Delays at a single Airport (DJD Date 44-54/72/75 Airport)
v. View Weather at an Airport (SLTD Airport)
w. View Out-of-Service information for a single Aircraft (RGO*Aircraft)
x. View Part Information (includes description & inventory) (MOC*Part #)
y. Defer a Maintenance Item on the MEL List (ROP Aircraft System Station Flight Position DispatcherCode Comment As illustrated in FIG. 1, it is further contemplated that an information request in accordance with FIGS. 1 and 3 may also emanate from a transport vehicle 22 with one or more transportable central processing unit 20 on board. In such an instance, the information request is typically communicated (in the instance of airline communications) through the Aeronautical Air Radio Incorporated System (ARINC) through a fire wall, and to the one or more first central processing unit 12 executing the proprietary software 13 whereupon the entry will be communicated directly to that software and an applicable data base for access.

Figure 3:
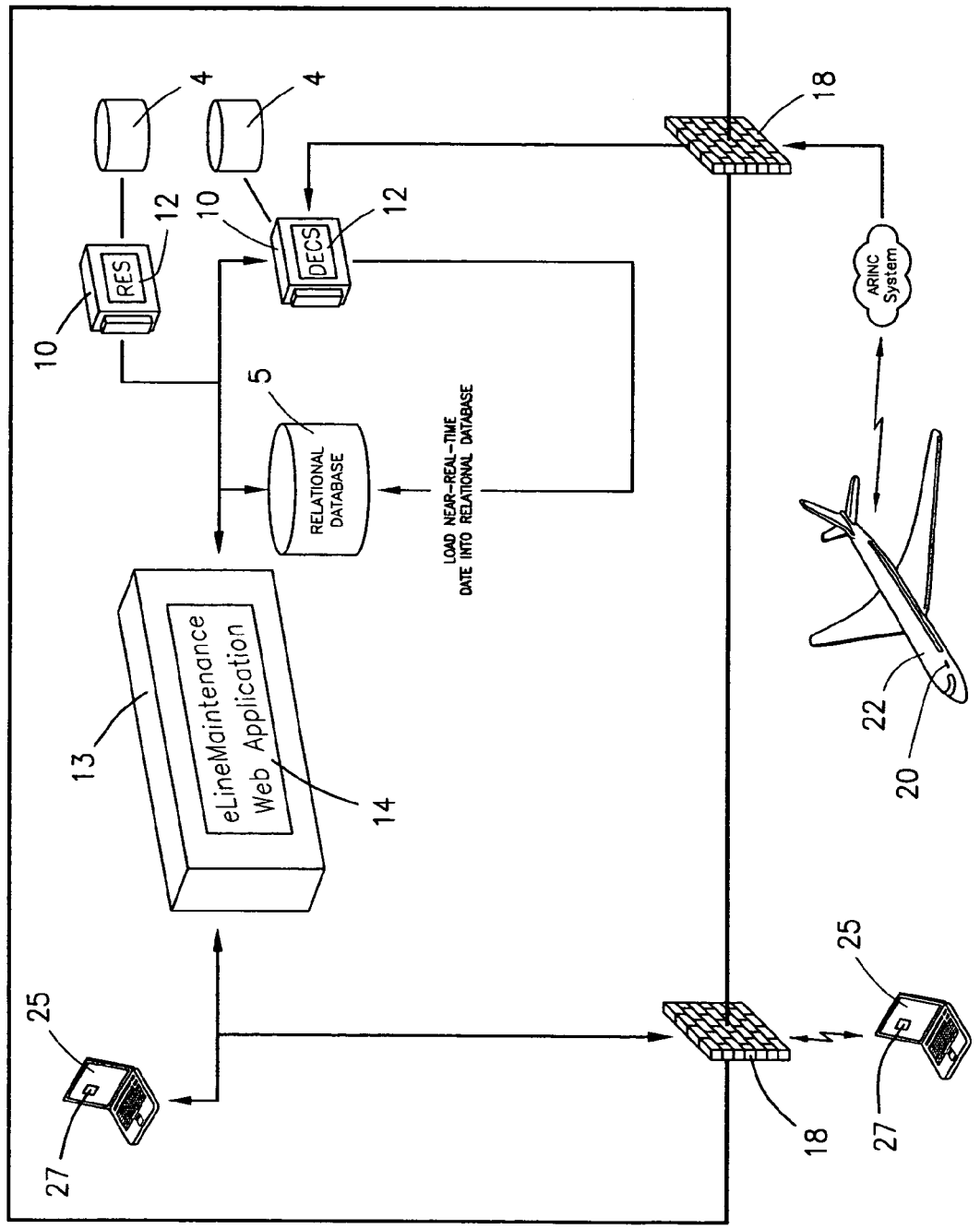
FIG. 3 is an illustration of one embodiment of the instant invention with respect to the invention's practice within the airline industry.

FIG. 3 illustrates a particularized illustration of one embodiment of the instant invention with respect to the invention's practice within the airline industry. Turning now to FIG. 3, in FIG. 3 it may be observed an additional database 5 is shown associated with the practice of the present invention. This database 5 may contain one or more records parsed from legacy systems 12 and stored in the database 5 for direct access by the web portal software 14, absent necessity to further communicate with the host central processing unit 10 and associated software 12. Typical non-limiting examples of instances and record types stored within this database for ready access and retrieval would include but not be limited to:

Flight Information—typically includes the flight schedule with up-to-the-minute status on whether the flight is during all phases of flight (On Ground, Off Ground, In Gate, Out of Gate). Additionally the flights database could contain an indicator to denote the aircraft's deicing status (required, not required or accomplished).

Maintenance Information—The database contains a table of open maintenance items that are referenced in the MEL (Minimum Equipment List) manual. Furthermore, the database contains ARMS messages, which are the messages sent from the Aircraft via a proprietary software system, such as the American Airlines ACARS system. The database might also include overnight workload assignments for every aircraft. Further included in this table could be an indicator of whether the maintenance was accomplished or deferred.

User Information—The database also contains user information such as Personnel Number, Name, Location and Job. This table is synchronized nightly with a proprietary software system such as the American Airline's SHARP system, which is the system Human Resources uses to manage employee data. Furthermore, the database could contain user specified settings that dictate how the web portal application displays data to and communicates with the user.

Station Information—The database contains a list of gates that are grouped into work zones for each station.

At times, the database in FIG. 3 is used to cache information that was taken from a host proprietary software system such as American Airline's DECS and RES systems. At other times, the database could be used instead of the host system. This is usually attributed to new functionality that has not been tested in the host, or a decision to modify or add new functionality in the database instead of building it in the host system.

Additionally, a request to the host may be generated. Depending on the response back from the host, additional information may be requested from a new application that exists only in the relational database in FIG. 3.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:

1. A computerized method for integrating and facilitating single source access to user community messaging, transport vehicle location status and vehicle maintenance requirements and servicing procedures comprising the steps of:

(a) providing a first database containing transport vehicle maintenance records and service requirements relating to one or more uniquely identifiable transport vehicles;

(b) providing one or more first host central processing units executing transport vehicle maintenance software, the host central processing unit and software in communication with the database of (a);

(c) providing one or more web-portal central processing units executing web-portal software in communication with an identifiable user community, the database of (a) and the one or more first host central processing units of (b);

(d) providing one or more transportable central processing units accommodated and positioned within a transport vehicle, the one or more transportable central processing units executing software in communication with the one or more first host central processing units and software of (b);

(e) providing one or more transportable central processing units accommodated and positioned geographically distant from the transport vehicle of (d), the one or more transportable central processing units executing user community software in communication with the web-portal central processing unit and web-portal software of (c);

(f) communicating a transport vehicle maintenance information request via the user community software of (e) from one or more users defined within the community of (c) to the web-portal software of (c) causing the web-portal software to access the databases of (a) and (b);

(g) interrogating the database of (a) in response to the user information request of (f); and (h) formatting the interrogated information of the database of (a) responsive to the user input request of (f) and communicating the formatted information to one or more users defined within the community of (c).

2. The method of claim 1 wherein the web portal software is further in communication with the host central processing unit executing first transfer vehicle maintenance software.

3. The method of claim 1 wherein the first provided database containing selective transport vehicle service records requirements relating to one or more uniquely identifiable transport vehicles is a segregated plurality of databases with each database of said plurality in communication with a uniquely identifiable host central processing unit.

4. The method of claim 3 further comprising the providing of at least one second database containing maintenance procedures relevant to the uniquely identifiable transport vehicle of claim 1(a).

5. The method of claim 4 further comprising the providing of one or more third databases containing transport vehicle origination, destination and statusing information.

6. The method of claim 1 wherein communicating a transport vehicle maintenance information request from one or users defined within the community of claim 1(c) to the web-portal software further comprises:
  (a) selecting an information action to be taken via the user community software from the group of actions including, Request Maintenance History for an Aircraft (KVA/DAYS/AIRCRAFT/SYSTEM/STATUS/PRIORITY), Request Open Maintenance Items for An Aircraft (RGMN AIRCRAFT), Request Flight Plan for the Aircraft for the next 3 Days (RGA Aircraft F3), Request Detailed Flight Information (FIL FLIGHT #), View Overnight Workload Schedule for an Aircraft (EW*STATION AIRCRAFT), Accomplish Overnight Workload Item (EJTA Aircraft Station Date JobName), Defer Overnight Workload Item (EWX Aircraft JobName Station Date), Add Part Number Reference to Maintenance Record Item (KP Part Number), Add Deferral Reason to Maintenance Record Item (KD Deferral Reason), Add Information Line to Maintenance Record Item (KI Text), Add Position Code to Maintenance Record Item (KPC PositionCode), Display an individual Maintenance Record Item (K* Record Number), Save an individual Maintenance Record Item (KET), Ignore Changes to a Maintenance Record Item (KIG), View Aircraft Configuration (JDM* Aircraft Number), View Engineering Change Orders for an Aircraft (M3P* Aircraft Number), View Inbound Flights to an Airport (RGS Airport), View Detailed Gate Activity for a single gate in an airport (RGT Airport Gate), View Flight Status Information (FL Flight Number), View Cancellations at a single Airport (XI*Airport), View Maintenance Delays at a single Airport (DJD Date 44-54/72/75 Airport), View Weather at an Airport (SLTD Airport), View Out-of-Service information for a single Aircraft (RGO*Aircraft), View Part Information (includes description & inventory) (MOC*Part #), and Defer a Maintenance Item on the MEL List (ROP) Aircraft System Station Flight Position DispatcherCode Comment;
  (b) parsing information action presented to the web-portal software from one or more users defined within the community of claim 1(c) and constructing an input entry recognizable by the transport vehicle software of claim 1(b) and communicating the input entry constructed to the transport vehicle software executing within the host processing unit(s) of claim 1(b);
  (c) executing the communicated entry of (b) and interrogating the information derived therefrom;
  (d) formatting the interrogated information of (c) by the web-portal software of claim 1(c) into a format recognizable to the user community software; and
  (e) communicating the formatted information of (d) from the web-portal software to the user community of claim 1(e).

7. The method of claim 6 further comprising:
  (a) communicating a transport vehicle maintenance requirement from a transportable central processing unit accommodated and positioned within a transport vehicle to the database of claim 1(a) via the host central processing unit and software of claim 1(b);
  (b) deriving an input entry recognizable to the transport vehicle software of claim 1(b);
  (c) executing the derived entry of (b) and interrogating the information resulting therefrom;
  (d) formatting the resulting information of (c) into a format recognizable to transportable central processing unit accommodated and positioned within a transport vehicle; and
  (e) communicating the formatted information of (d) from the host central processing unit and software of claim 1(b) to the web-portal software to the transportable central processing unit accommodated and positioned within the transport vehicle of (d).

8. A computerized method for integrating and facilitating single source access to user community messaging, transport vehicle location status (gates) and vehicle maintenance requirements and servicing procedures comprising the steps of:
  (a) providing a first database containing transport vehicle maintenance records and service requirements relating to one or more uniquely identifiable transport vehicles;
  (b) providing one or more first host central processing unit executing transport vehicle maintenance software, the host central processing unit and software in communication with the database of (a);
  (c) providing one or more web-portal central processing units executing web-portal software in communication with an identifiable user community, the database of (a) and the one or more first host central processing units of (b);
  (d) providing one or more transportable central processing units accommodated and positioned within a transport vehicle, the one or more transportable central processing units executing software in communication with the one or more first host central processing units and software of (b);
  (e) providing one or more transportable central processing units accommodated and positioned geographically distant from the transport vehicle of (d), the one or more transportable central processing units executing user community software in communication with the web-portal central processing unit and web-portal software of (c);
  (f) selecting an information action to be taken via the user community software from the group of actions including, Request Maintenance History for an Aircraft (KVA/DAYS/AIRCRAFT/SYSTEM/STATUS/PRIORITY), Request Open Maintenance Items for An Aircraft (RGMN AIRCRAFT), Request Flight Plan for the Aircraft for the next 3 Days (RGA Aircraft F3), Request Detailed Flight Information (FIL FLIGHT #), View Overnight Workload Schedule for an Aircraft (EW*STATION AIRCRAFT), Accomplish Overnight Workload Item (EJTA Aircraft Station Date JobName), Defer Overnight Workload Item (EWX Aircraft Job- Name Station Date), Add Part Number Reference to Maintenance Record Item (KP Part Number), Add Deferral Reason to Maintenance Record Item (KD Deferral Reason), Add Information Line to Maintenance Record Item (KI Text), Add Position Code to Maintenance Record Item (KPC PositionCode), Display an individual Maintenance Record Item (K* Record Number), Save an individual Maintenance Record Item (KET), Ignore Changes to a Maintenance Record Item (KIG), View Aircraft Configuration (JDM* Aircraft Number), View Engineering Change Orders for an Aircraft (M3P* Aircraft Number), View Inbound Flights to an Airport (RGS Airport), View Detailed Gate Activity for a single gate in an airport (RGT Airport Gate), View Flight Status Information (FL Flight Number), View Cancellations at a single Airport (XI*Airport), View Maintenance Delays at a single Airport (DJD Date 44-54/72/75 Airport), View Weather at an Airport (SLTD Airport), View Out-of-Service information for a single Aircraft (RGO*Aircraft), View Part Information (includes description & inventory) (MOC*Part #), and Defer a Maintenance Item on the MEL List (ROP) Aircraft System Station Flight Position DispatcherCode Comment;

(g) parsing information action presented to the web-portal software from one or more users defined within the community of (c) and constructing an input entry recognizable by the transport vehicle software of (b) and communicating the input entry constructed to the transport vehicle software executing within the host processing unit(s) of (b);

(h) communicating the input entry constructed in (g) to the transport vehicle software executing within the host processing unit(s) of (b);

(i) executing the communicated entry of (h);

(j) interrogating the database of (a) in response to the user input entry executed in (i);

(k) formatting the interrogated information of (j) by the web-portal software into a format recognizable to the user community software of (e); and (l) communicating the formatted information of (k) from the web-portal software to the user community software of (e).

9. The method of claim 8 wherein the web portal software is further in communication with the database of (a) and host central processing unit executing first proprietary maintenance software.

10. The method of claim 9 further comprising:

(a) communicating a transport vehicle maintenance requirement from a transportable central processing unit accommodated and positioned within a transport vehicle to the database of claim 8(a) via the host central processing unit and software of claim 8(b);

(b) deriving an input entry recognizable to the transport vehicle software of 8(b);

(c) executing the derived entry of (b) and interrogating the information resulting therefrom;

(d) formatting the resulting information of (c) into a format recognizable to a transportable central processing unit accommodated and positioned within a transport vehicle; and (e) communicating the formatted information of (d) from the host central processing unit and software of claim 8(b) to the web-portal software to the transportable central processing unit accommodated and positioned within the transport vehicle of (d).

11. The method of claim 1 wherein the provided one or more host central processing units and transport vehicle maintenance software are central processing units and proprietary software of American Airlines.

12. The method of claim 11 wherein said software is the American Airlines Sabre® system, associated databases and communications protocols associated therewith.

13. The method of claim 8 wherein the provided one or more host central processing units and transport vehicle maintenance software are central processing units and proprietary software of American Airlines.

14. The method of claim 13 wherein said software is the American Airlines Sabre® system, associated databases and communications protocols associated therewith.

* * * * *